F. L. ROWNTREE.
BALL BEARING CASTER.
APPLICATION FILED JULY 10, 1916.
1,203,054.
Patented Oct. 31, 1916.
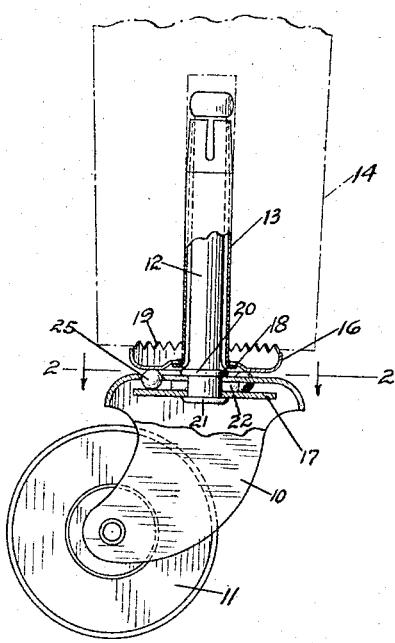
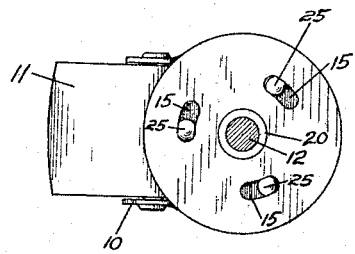
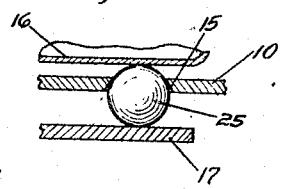
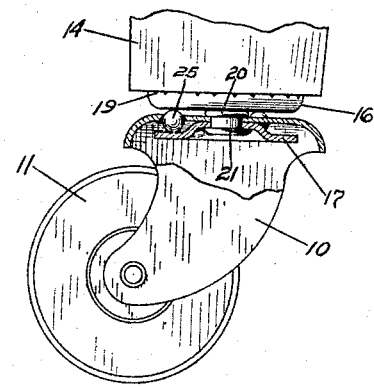
WITNESS
Chester F. Hayden.
INVENTOR
Frank L. Rowntree
BY
A. M. Booster
ATTORNEY

UNITED STATES PATENT OFFICE.

FRANK L. ROWNTREE, OF MERIDEN, CONNECTICUT, ASSIGNOR TO FOSTER, MERRIAM AND COMPANY, OF MERIDEN, CONNECTICUT, A CORPORATION OF CONNECTICUT.

BALL-BEARING CASTER.

1,203,054.

Specification of Letters Patent.

Patented Oct. 31, 1916.

Application filed July 10, 1916. Serial No. 108,299.

*To all whom it may concern:*

Be it known that I, FRANK L. ROWNTREE, a citizen of the United States, residing at Meriden, county of New Haven, State of Connecticut, have invented an Improvement in Ball-Bearing Casters, of which the following is a specification.

This invention has for its object to produce a caster of the ball bearing type which shall be so simple and inexpensive to make that the cost of production will not be appreciably greater than that of ordinary casters, while at the same time the freedom of movement and other advantages of ball bearing casters will be secured. This object I attain by reducing the number of parts to the minimum, all of said parts being inexpensive to make and easy to assemble, and the arrangement of the parts being, so far as I am aware, entirely new.

With this end in view, I have devised the simple and novel ball bearing caster which I will now describe, referring to the accompanying drawing forming a part of this specification, and using reference characters to indicate the several parts.

Figure 1 is a view partly in elevation and partly in section, illustrating the construction and operation of my novel caster; Fig. 2 a plan view, the pintle being in section on the line 2—2 in Fig. 1, looking in the direction of the arrows; Fig. 3 a detail sectional view on an enlarged scale, and Fig. 4 is a view similar to Fig. 1, illustrating a slightly variant form of construction.

10 denotes the horn of a caster, 11 the wheel, 12 the pintle, 13 the socket, and 14 a furniture leg having a hole to receive the socket. The novelty consists in providing the top plate of the horn with a plurality of arc-shaped undercut slots 15 in which the balls 25 lie, and providing an upper washer 16 and a lower washer 17 between which the balls travel. The lower end of the socket is provided with an outwardly turned flange 18 upon which the upper washer rests. This washer is shown as made cup-shaped and as provided at its upper edge with teeth 19 which may be driven into the lower end of the furniture leg. The pintle is provided near its lower end with a collar 20, the lower end of the pintle being passed through central holes in the top plate of the horn and in the lower washer, and the end thereof headed, as at 21, the horn and lower washer lying between the collar and the heading and both being free to rotate on the pintle. The lower washer and the top plate of the horn may be spaced apart to provide room for the balls by an intermediate washer 22, as in Fig. 1, or the centers of the lower washer and the top plate of the horn may lie close together, as in Fig. 4, and the lower washer be curved downward and then outward to provide room for the balls. By making the slots in the horn undercut, as clearly shown in Fig. 3, and the slots of less width than the diameter of the balls, the balls are retained in place independently of the upper washer.

Having thus described my invention, I claim:—

1. A caster comprising a horn having arc-shaped slots, an upper washer, a lower washer, a pintle upon which the horn and lower washer are mounted to rotate, and balls lying in the slots in the horn and between the upper and lower washers.

2. A caster comprising a horn having arc-shaped undercut slots, upper and lower washers, a pintle upon which the horn and lower washer are mounted to rotate, and balls lying in the slots in the horn and between the washers, the slots being of less width than the diameter of the balls, whereby the balls are retained in place independently of the upper washer.

3. A caster comprising a horn having arc-shaped slots, upper and lower washers, a pintle having a collar and a heading by which the horn and lower washer are rotatably retained in place, and balls lying in the slots in the horn upon which the washers bear.

4. A caster comprising a horn having arc-shaped slots, upper and lower washers, a spacing washer intermediate the horn and the lower washer, a pintle on which the horn and the intermediate and lower washers are mounted to rotate, and balls lying in the slots in the horn and between the upper and lower washers.

In testimony whereof I affix my signature.

FRANK L. ROWNTREE.

Copies of this patent may be obtained for five cents each, by addressing the "Commissioner of Patents, Washington, D. C."